United States Patent
Keller et al.

[15] 3,705,756
[45] Dec. 12, 1972

[54] TERMINAL MEMBER FOR LIGHT TRANSMITTING MEANS

[72] Inventors: Joseph Richard Keller; James Pritulsky, both of Harrisburg, Pa.

[73] Assignee: AMP Domestic, Inc.

[22] Filed: Dec. 28, 1970

[21] Appl. No.: 101,655

Related U.S. Application Data

[60] Division of Ser. No. 858,549, April 29, 1969, Pat. No. 3,638,008, which is a continuation-in-part of Ser. No. 591,254, Nov. 1, 1966, abandoned.

[52] U.S. Cl. .................................................350/96 B
[51] Int. Cl. .................................................G02b 5/16
[58] Field of Search .....................................350/96 B

[56] References Cited

UNITED STATES PATENTS

| | | |
|---|---|---|
| 3,510,641 | 5/1970 | Reynolds.......................350/96 B X |
| 3,538,321 | 11/1970 | Longenecker et al...........350/96 B X |
| 3,572,891 | 3/1971 | Longenecker....................350/96 B |
| 3,517,981 | 6/1970 | Rueger et al....................350/96 B |
| 3,569,933 | 3/1971 | Longenecker et al..........350/96 B X |

*Primary Examiner*—David H. Rubin
*Attorney*—William J. Keating, Ronald D. Grefe, Gerald K. Kita, Frederick W. Raring, Jay L. Seitchik and John P. Vandenburg

[57] ABSTRACT

A terminal member for terminating an end of a light transmission means for use in a device for effecting multiple light transmission from a single light source. The terminal member is crimped onto the end of a fiber-optics member to facilitate connection of the fiber-optics member to a panel display.

4 Claims, 6 Drawing Figures

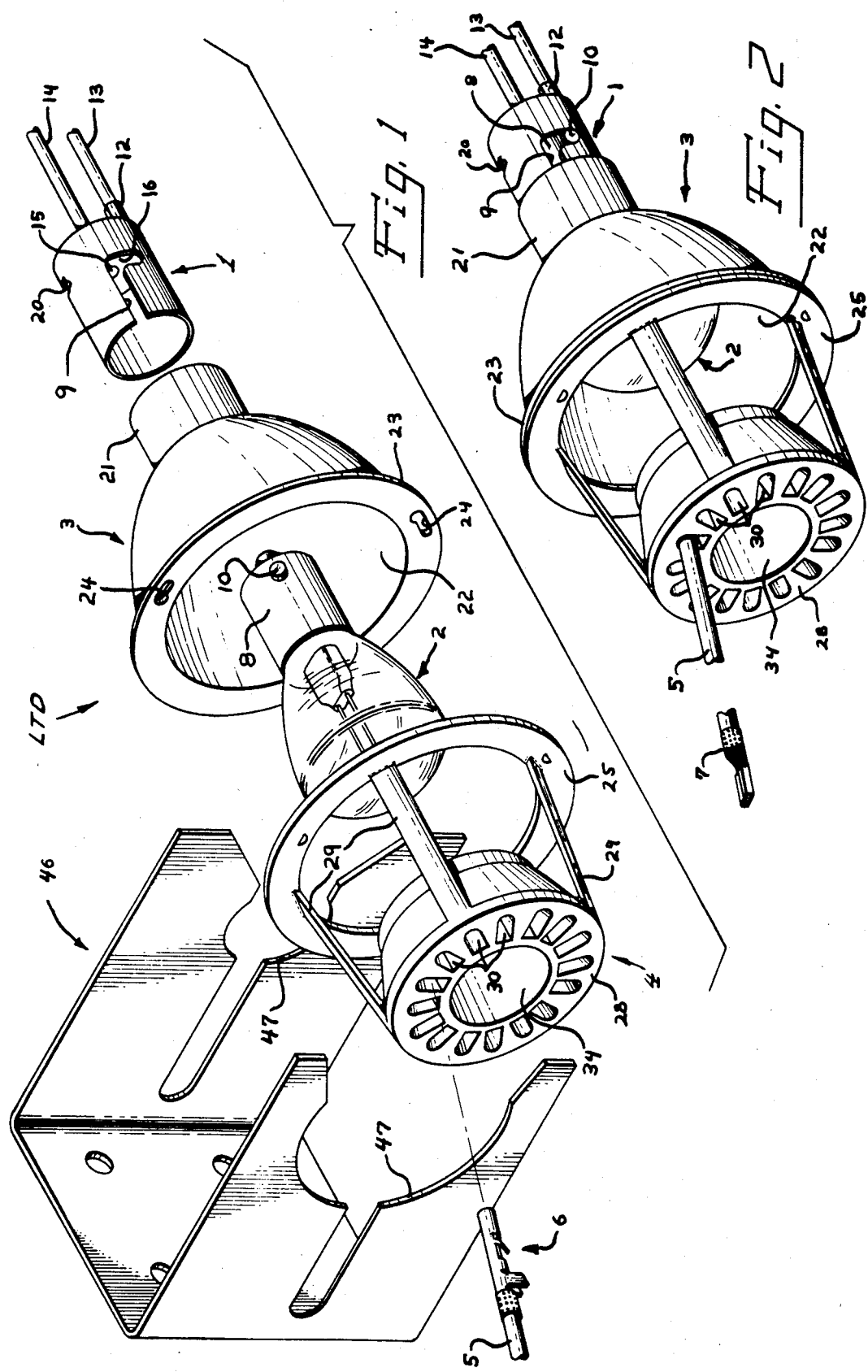

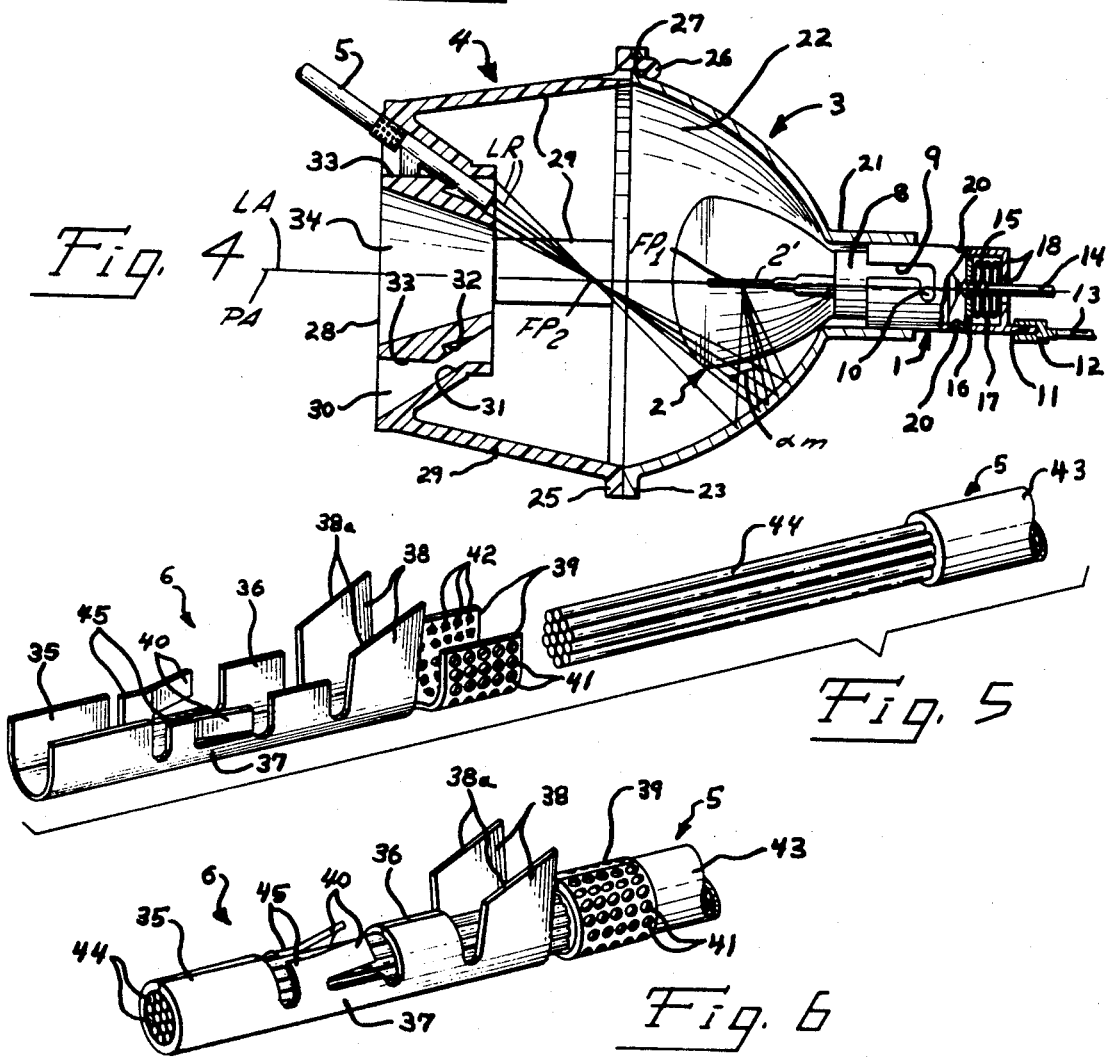

TERMINAL MEMBER FOR LIGHT TRANSMITTING MEANS

This is a division of application Ser. No. 858,549, filed Apr. 29, 1969, now U.S. Pat. No. 3,638,008, which, in turn, is a continuation-in-part of application Ser. No. 591,254, filed Nov. 1, 1966 and now abandoned.

This invention relates to light transmission and more particularly to multiple light transmission from a single light source.

In applications in which light is used as a medium to transmit intelligence, to provide illumination, to provide sensing, signalling and monitoring, or the like the general practice is to provide complex systems of electric light bulbs, electric wiring, and, in some cases, relay or electronic components to complete the intended function. Such systems are expensive, their reliability is dependent upon all parts functioning properly and their flexibility is limited.

An object of the invention is to provide a light-transmission device wherein a number of light transmission members transmits light from a single light source.

Another object is the provision of a multiple light-transmission device having a reflection means to utilize in an optimum manner the light from a single light bulb.

A further object is to provide a multiple light-transmission device including a mounting means in which the ends of light transmitting members are removably mounted in an optimum angular disposition relative to light-reflecting means to receive the greatest intensity of light emanating from the light bulb.

An additional object is the provision of means on the reflecting means or between the light source and the ends of the light-transmitting members to absorb unwanted spectra of the light emanating from the light bulb.

A still further object is to provide means on the multiple light-transmitting device to prevent heat build-up by the light bulb.

Other objects and attainments of the present invention will become apparent to those skilled in the art upon a reading of the following detailed description when taken in conjunction with the drawings in which there are shown and described an illustrative embodiment of the invention; it is to be understood; however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a multiple light-transmission device which comprises a reflecting member having a light bulb receiving means for receiving a light bulb therein, mounting means on the reflecting member, and light-transmitting members having ends secured in the mounting means and angularly positioned therein to receive light reflected from the reflecting member.

IN THE DRAWINGS

FIG. 1 is an exploded perspective view of a light-transmission device;

FIG. 2 is a view similar to FIG. 1 in an assembled condition;

FIG. 3 is a cross-sectional view of a mounting member for mounting ends of light-transmitting members with one of the light-transmitting members in position and another one exploded therefrom;

FIG. 4 is a cross-sectional view of the light-transmission device of FIG. 2;

FIG. 5 is a perspective and exploded view of a terminal member and a light-transmitting member prior to being applied to the end of the light-transmitting member; and FIG. 6 is a view similar to FIG. 5 but in an assembled condition.

Turning now to the drawings, a light-transmission device LTD is illustrated in FIGS. 1 through 4. The light transmission device includes a bulb socket 1, a light bulb 2, light bulb filament 2' (not shown), a reflector 3, a mounting member 4, light-transmitting members 5 and terminal members 6 and 7 secured on the ends of light-transmitting members 5.

Bulb socket 1 receives metallic base 8 of light bulb 2 and bayonet openings 9 (only one being shown) receive lugs 10 (only one being shown) in order to maintain light bulb 2 in position within socket 1 and to define an outer electrical contact for light bulb 2. Socket 1 also includes a tab 11 electrically connected to electrical terminal 12 crimped onto electrical lead 13. Another electrical lead 14 is crimped onto electrical button terminal 15 secured in insulator 16. A coil spring 17 is disposed between lugs 18 at the end of socket 1 and insulator 16 to bias terminal 15 into engagement with the center contact of light bulb 2. When light bulb 2 is not disposed in socket 1, insulator 16 rests against inwardly-directed projections 20 in socket 1.

Reflector 3 is made from any suitable material and includes a socket-receiving section 21 in which socket 1 frictionally fits and a reflection surface 22 defining an ellipsoidal reflection surface. The socket may be so positioned within the reflector that a light source; i.e., light bulb filament 2' held by the socket is substantially at the focal point $FP_1$ of the reflector. In such case, as well known, substantially all of the reflected light rays LR would then be directed toward a second focal point $FP_2$ spaced from the reflector. Reflector 3 also includes a flange 23 having bayonet openings 24 equally spaced therearound.

Mounting member 4 comprises an annular member 25 having lugs 26 extending outwardly from one surface thereof which are mateable with bayonet openings 24 and these lugs include lips 27 for engagement with flange 23 of reflector 3 in order to secure reflector 3 and mounting member 4 together. A housing 24 is spaced from annular member 25 and is connected thereto by legs 29. Openings 30 extend through housing 28 and are equally spaced around a longitudinal axis LA of mounting member 4.

Each opening 30 is angularly disposed with respect to the longitudinal axis of mounting member 4 and includes a round section 31 provided with a locking depression 32. A flat surface 33 extends from the entrance of opening 30 inwardly and intersects with section 31 and continues on the other side of round section 31 to the inner end of opening 30, this surface being substantially parallel with respect to the longitudinal axis of mounting member 4. Thus, the outer part of opening 30 from its entrance to round section 31 is in the shape of an arched window having decreasing dimensions and the same configuration results from the inner end of opening 30 to round section 31. A conically-shaped opening 34 extends through housing 28. The open spaces between legs 29 and opening 34 provide ventillation to minimize the heat generated by the light bulb.

Terminal member 6 is illustrated in detail in FIGS. 5 and 6 and includes first and second sections 35 and 36, securing sections 37 and 38 and in insulation-engaging section 39. Sections 35, 36 and 39 in their flat positions prior to being formed into their presently U-shaped configurations have a substantially rectangular configuration. Securing section 37 includes lenses 40 and securing section 38 has beveled surfaces 38a. Insulation support section 39 includes openings 41 having inwardly-beveled sections 42 located on the inner surface of section 39 which are generally of a frusto-conical configuration. Section 42 may, however, be serrated or take any other suitable form to perform the intended function.

Termination members 6 are susceptible to mass production by automatic machinery and are conveniently formed by shaping a sheet metal blank or strip of a suitable material such as brass or the like in successive forming steps. The metal is sufficiently hard and resilient and has spring-like characteristics, yet it is sufficiently malleable to permit crimping of the termination members onto light-transmitting members 5 to effect an excellent mechanical connection therewith.

Light-transmitting members 5 comprise a covering member 43 of compressible and resilient plastic surrounding light-transmitting elements 44 made from any suitable light-transmitting material and the number of light-transmitting elements depends upon the amount of light to be transmitted. Each of the light-transmitting elements is surrounded with a coating of material having reflecting characteristics so as to transmit the light therealong. The light-transmitting members are preferably of the type manufactured by E.I. DuPont DeNemours and Company under the trademark CROFON.

The light-transmitting members are flexible so that in bending the light-transmitting elements to accomodate a desired situation, the light-transmitting elements move relative to each other, and, if the ends of the light-transmitting members are not properly terminated, the ends of the light-transmitting elements extend outwardly from the ends of the covering member in an irregular manner thereby resulting in an improper alignment for the ends of the light-transmitting elements. The light-transmitting members are therefore most effective when the ends of all of the light-transmitting elements are located in the same or substantially the same plane.

As can be discerned from FIG. 5, the light-transmitting member has been stripped to bear a portion of the ends of the light-transmitting elements and the stripped light-transmitting member is placed within the termination member with the light-transmitting elements disposed within section 35 through 38 while covering member 43 is disposed within section 39. The U-shaped configuration of the terminal member makes it easy for the stripped light-transmitting member to be placed within the terminal member; however, the terminal member may be formed in any other desirable manner so long as the light-transmitting member can be inserted therewithin.

With the light-transmitting member in position within the terminal member, the terminal member is subjected to a crimping operation by crimping dies (not shown) to crimp the terminal member onto the light-transmitting member. The terminal member is crimped onto the light-transmitting member in accordance with the disclosure of U.S. Pat. Application Ser. No. 557,797, filed June 15, 1966, now U.S. Pat. No. 3,517,981 so as not to restrict the transmission characteristics of the light-transmitting member.

The crimping dies preferably form sections 35 through 37 and 39 into a circular configuration onto the light-transmitting elements and covering member. It is to be understood, however, that these sections can be formed into other geometrical configurations as desired to accomodate a desired purpose. Thus, the light-transmitting elements are collected in a dense and substantially uniform manner of desired geometrical configuration. The crimping dies engage all of sections 35, 36 and 39 and parts 45 of section 37 thereby not engaging section 38 and lances 40. As section 39 is being crimped onto covering member 43, inwardly-bevelled sections 42 penetrate the covering members so as to securely position the terminal member on the light-transmitting member. Thus, section 39 defines a strain-relief means for the terminal member. In the event that the light-transmitting member is not to be subjected to undue strains, sections 35 through 37 can be used to terminate the stripped light-transmitting member and section 39 can be eliminated. Terminal member 7 is of the type disclosed in U.S. Pat. application Ser. No. 583,372, filed Sept. 30, 1966 now U.S. Pat. No. 3,572,891.

As illustrated in FIGS. 3 and 4, terminated terminal members 6 are disposed in openings 30 in accordance with the angular disposition of openings 30 relative to the longitudinal axis LA of mounting member 4. Lances 40 are disposed in locking depressions 32 to prevent the terminal members from being withdrawn from housing 28 and beveled edges 38a engage flat surface 33 in order to limit the inner movement of the terminal members within openings 30 so that the ends of terminal members 6 are disposed at the inner ends of openings 30 to receive reflected light from reflecting surface 22. Beveled edges 38a also maintain the terminal members against the arcuate surfaces of the openings. Lances 40 can be depressed to permit removal of the terminal members from openings 30.

The angular disposition of terminal members 6 within openings 30 permits the greatest intensity of light reflected from reflecting surface 22 to be received by the light-transmitting members because the ellipsoidal-reflecting surface accomplishes this important feature. Thus, the proper angular disposition of the light-transmitting members relative to the major or principal axis PA (which coincides with the longitudinal axis of mounting member 4) of the ellipsoidal-reflecting surface determines the intensity of the light to be received by the light-transmitting members. In effect, a bundle of light rods with their end surfaces normal to the median angle $\alpha_m$ of the light falling on the apertured plate 28 matches the acceptance angle of the rods to the light source. If desired, more than one annular row of light-transmitting members may be provided in housing 28, but for each row of light-transmitting members, a filament is necessary in the light bulb or light source for maximum light intensity; however, a filament of sufficient length along the major axis may be used if maximum light intensity is not essential.

Filters may be placed between the light source and the plane of the ends of the light-transmitting members to filter out or absorb an unnecessary part of the light spectrum. In this respect the glass of the light bulb will filter out infrared light. The reflector may also be used in a slightly defocused manner by adjusting the position of the light source relative to the focal point of the reflector. Also, instead of filters, the reflecting surface may be coated with the light-absorbing substance to absorb the unnecessary part of the light spectrum. Any heat-dissipating means may be applied to the exterior surface of the reflector to dissipate heat therefrom. If desired, means may be provided to adjust the light bulb along the major axis and relative to the reflecting surface.

A U-shaped mounting bracket 46 has Y-shaped openings 47 in each leg thereof to receive section 21 of reflector 3 and housing 28 of mounting member 4 to mount the light-transmission device.

While the terminal member has been disclosed as being applied to a stripped end of a light-transmitting member it is obvious that the terminal member can be applied to a non-stripped end of a light-transmitting member with sections 35 and 36 being provided with openings 41 and inwardly beveled sections 42 thereby eliminating section 39.

As can be discerned, a light-transmission device has been disclosed to transmit via light-transmitting members multiple light transmission from a single light source.

It will, therefore, be appreciated that the aforementioned and other desirable objects have been achieved; however, it should be emphasized that the particular embodiment of the invention, which is shown and described herein, is intended as merely illustrative and not as restrictive of the invention.

We claim:

1. A terminal member for terminating an end of light-transmitting means comprising a first section and a second section having a generally rectangular configuration, a third section between said first and second sections and including lance means extending divergently outwardly therefrom, and a fourth section extending outwardly from said third section and including beveled edges, said sections being in axial alignment with each other and being formed into a U-shaped configuration and said first, second and third sections being bent into secured engagement with said end of said light-transmitting means with a minimum of deformation thereto and with said lance means and beveled edges being directed toward each other.

2. An elongated terminal member securable on a covering member and light-transmitting elements of light-transmitting means comprising a first ferrule member for receiving said light-transmitting elements and a second ferrule member for receiving said covering member with both said members having a generally U-shaped configuration; said members being in axial alignment with each other, said first ferrule member including longitudinally spaced sections being bendable into engagement with said light-transmitting elements, one section having substantially parallel legs provided with beveled edges extending out-wardly from said spaced sections and one of said spaced sections having stop means in the form of lances extending divergently outwardly from the spaced section from which they extend and longitudinally spaced from the one section; said second ferrule member being bendable into engagement with said covering member; said ferrule members being formable into a geometrical configuration while being formed into engagement with said light-transmitting elements and said covering member with a minimum of deformation to said light-transmitting elements.

3. A terminal member according to claim 2 wherein said second ferrule member includes means to penetrate said covering member to secure said second ferrule member thereto.

4. A terminal member securable on a covering member and light-transmitting elements of light-transmitting means comprising a first ferrule member for receiving said light-transmitting elements and a second ferrule member for receiving said covering member, said members being in axial alignment with each other with both said members having a generally U-shaped configuration; said first ferrule member including spaced sections being bendable into engagement with said light-transmitting elements, one section having substantially parallel legs provided with beveled edges extending outwardly from said spaced sections and one of said spaced sections having lances extending divergently outwardly from the spaced section from which they extend; said second ferrule member being bendable into engagement with said covering member; said ferrule members being formable into a geometrical configuration while being formed into engagement with said light-transmitting elements and said covering member with a minimum of deformation to said light-transmitting elements, said lances and said beveled edges defining means to secure said terminal member in an opening of a housing means.

* * * * *